(12) United States Patent
Sakaguchi et al.

(10) Patent No.: US 10,487,937 B2
(45) Date of Patent: Nov. 26, 2019

(54) CASE FOR ENDLESS TRANSMISSION MEMBER

(71) Applicants: TOYOTA JIDOSHA KABUSHIKI KAISHA, Toyota-shi (JP); AISIN SEIKI KABUSHIKI KAISHA, Kariya-shi (JP)

(72) Inventors: Kenta Sakaguchi, Nagoya (JP); Kengo Yamamoto, Toyota (JP)

(73) Assignees: TOYOTA JIDOSHA KABUSHIKI KAISHA, Toyota-shi (JP); AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/448,158

(22) Filed: Mar. 2, 2017

(65) Prior Publication Data

US 2017/0254409 A1    Sep. 7, 2017

(30) Foreign Application Priority Data

Mar. 7, 2016    (JP) ................................. 2016-043459

(51) Int. Cl.
*F02B 67/06* (2006.01)
*F16H 57/04* (2010.01)
(Continued)

(52) U.S. Cl.
CPC .......... *F16H 57/0475* (2013.01); *F01M 9/06* (2013.01); *F01M 11/02* (2013.01); *F02F 7/0073* (2013.01);
(Continued)

(58) Field of Classification Search
CPC ...... F02B 67/06; F16H 57/0475; F16H 57/05; F01M 1/06; F01M 1/03; F01M 1/02; F01M 9/12; F02F 2007/0078
See application file for complete search history.

(56) References Cited

U.S. PATENT DOCUMENTS 5,800,299 A * 9/1998 Lamers ............... F16H 57/0421
474/45
5,954,159 A * 9/1999 Nakamura ................ F01L 1/02
184/11.2
(Continued)

FOREIGN PATENT DOCUMENTS

JP       7-63025        3/1995
JP     2003-49623 A     2/2003
(Continued)

OTHER PUBLICATIONS

Extended European Search Report dated Jul. 31, 2017 in Patent Application No. 17158662.1.

*Primary Examiner* — Vicky A Johnson
(74) *Attorney, Agent, or Firm* — Oblon, McClelland, Maier & Neustadt, L.L.P.

(57) ABSTRACT

A case for an endless transmission member includes a first case member attached to a vehicle-mounted internal combustion engine and a second case member attached to the first case member. The first and second case members define an accommodation chamber that accommodates an endless transmission member looped over rotating bodies of the engine. The first case member includes a communication hole that connects the accommodation chamber to the inside of the engine. The first or second case member includes a guide rib that guides lubricant from the accommodation chamber to the inside of the engine. In an orientation of the case when the engine is installed in a vehicle, the guide rib is provided along part of the lower side of the opening edge of the communication hole including the lower end of the opening edge.

4 Claims, 5 Drawing Sheets

(51) Int. Cl.

| | |
|---|---|
| *F01M 11/02* | (2006.01) |
| *F16H 57/025* | (2012.01) |
| *F16H 57/035* | (2012.01) |
| *F16H 57/05* | (2006.01) |
| *F02F 7/00* | (2006.01) |
| *F01M 9/06* | (2006.01) |
| *F01M 9/12* | (2006.01) |

(52) U.S. Cl.
CPC ......... *F16H 57/025* (2013.01); *F16H 57/035* (2013.01); *F16H 57/0423* (2013.01); *F16H 57/0424* (2013.01); *F16H 57/05* (2013.01); *F01M 9/12* (2013.01); *F02B 67/06* (2013.01); *F02F 2007/0078* (2013.01)

(56) References Cited

U.S. PATENT DOCUMENTS

| | | | |
|---|---|---|---|
| 6,561,156 B2* | 5/2003 | Iizuka | F01L 1/02 |
| | | | 123/196 M |
| 2007/0277761 A1 | 12/2007 | Takada et al. | |
| 2011/0180033 A1* | 7/2011 | Hoshito | F01L 1/022 |
| | | | 123/196 A |
| 2013/0068191 A1* | 3/2013 | Takeuchi | F01L 1/02 |
| | | | 123/195 R |

FOREIGN PATENT DOCUMENTS

| | | |
|---|---|---|
| JP | 2013-130080 A | 7/2013 |
| JP | 2015-113811 A | 6/2015 |

\* cited by examiner

Fig.8

CASE FOR ENDLESS TRANSMISSION MEMBER

BACKGROUND OF THE DISCLOSURE

The present disclosure relates to a case for an endless transmission member. The case is attached to a vehicle-mounted internal combustion engine.

Japanese Laid-Open Patent Publication No. 07-063025 discloses a chain case for accommodating chains that are looped over sprockets of a vehicle-mounted internal combustion engine. The chain case of this publication includes a first case member attached to the vehicle-mounted internal combustion engine and a second case member attached to the first case member. The first case member and the second case member define a chain chamber for accommodating chains. The chain case of this publication includes a communication hole for returning lubricant that has scattered inside the chain chamber to the inside of the internal combustion engine.

In a case in which the communication hole is provided in the chain case like the chain case disclosed in the above-described publication, the greater the opening area of the communication hole, the more easily the lubricant returns to the inside of the internal combustion engine. However, the area provided for the opening area of the communication hole is limited. Thus, there is a demand for a structure that efficiently returns the lubricant to the inside of the internal combustion engine without increasing the opening area of the communication hole provided in the chain case.

SUMMARY OF THE INVENTION

To achieve the foregoing objective and in accordance with one aspect of the present disclosure, a case for an endless transmission member is provided. The case includes a first case member configured to be attached to a vehicle-mounted internal combustion engine and a second case member attached to the first case member. The first case member and the second case member define an accommodation chamber configured to accommodate an endless transmission member looped over a plurality of rotating bodies of the vehicle-mounted internal combustion engine. The first case member includes a communication hole configured to connect the accommodation chamber to an inside of the vehicle-mounted internal combustion engine. The first case member or the second case member includes a guide rib configured to guide lubricant from the accommodation chamber to the inside of the vehicle-mounted internal combustion engine. In an orientation of the case when the vehicle-mounted internal combustion engine is installed in a vehicle, the guide rib is provided along part of a lower side of an opening edge of the communication hole including a lower end of the opening edge.

With this configuration, in the accommodation chamber inside the case, lubricant that drops from above the communication hole and lubricant that flows down along the inner surface of the first case member are received by the upper surface of the guide rib. The lubricant that is received by the upper surface of the guide rib is guided toward the inside of the vehicle-mounted internal combustion engine by the guide rib. Thus, the lubricant is efficiently returned to the inside of the internal combustion engine without increasing the opening area of the communication hole in the first case member.

In the orientation of the case when the vehicle-mounted internal combustion engine is installed in the vehicle, the guide rib may include an upper surface including an inclined surface that is inclined downward from the inside of the accommodation chamber toward the opening edge. With this configuration, the lubricant received by the upper surface of the guide rib easily flows down toward the inside of the vehicle-mounted internal combustion engine along the downward inclination of the inclined surface of the guide rib. Thus, the lubricant is prevented from being left adhered to the guide rib and failing to be returned to the inside of the vehicle-mounted internal combustion engine.

In the orientation of the case when the vehicle-mounted internal combustion engine is installed in the vehicle, the communication hole may include a section in which a width of the communication hole decreases toward the lower end of the opening edge. With this configuration, the guide rib includes a portion that extends to incline downward toward the lower end of the communication hole. Thus, the lubricant received by the guide rib is prevented from spilling to the outer side of the guide rib in the extending direction.

In the orientation of the case when the vehicle-mounted internal combustion engine is installed in the vehicle, the communication hole may be located in a region above a position of at least one of the plurality of rotating bodies and outward of a path of the endless transmission member.

With this configuration, some of the scattered lubricant is returned to the inside of the vehicle-mounted internal combustion engine via the communication hole, and the amount of lubricant that flows down to the rotating bodies below the communication hole and to the vicinity of the rotating bodies is reduced. Thus, the lubricant that has flowed down is restrained from contacting the rotating bodies or the endless transmission member to be scattered again.

The first case member may include a main wall portion including the communication hole and a peripheral wall portion extending from the main wall portion toward the second case member. The peripheral wall portion may extend along a periphery of the main wall portion to surround an outer side of a path of the endless transmission member. The communication hole and the guide rib may be provided to reach a position on the main wall portion where the peripheral wall portion is provided.

With this configuration, the lubricant that is adhered to the endless transmission member is easily adhered to the peripheral wall portion, which surrounds the endless transmission member, by centrifugal force generated by operation of the endless transmission member. Since the communication hole and the guide rib reach the position on the main wall portion where the peripheral wall portion is provided, the lubricant that adheres to the peripheral wall portion and flows down along the peripheral wall portion is guided by the guide rib and easily returned to the inside of the vehicle-mounted internal combustion engine via the communication hole.

BRIEF DESCRIPTION OF THE DRAWINGS

The features of the present disclosure that are believed to be novel are set forth with particularity in the appended claims. The disclosure, together with objects and advantages thereof, may best be understood by reference to the following description of the presently preferred embodiments together with the accompanying drawings in which:

DESCRIPTION OF THE PREFERRED EMBODIMENTS

Hereinafter, one embodiment of the present disclosure will be described with reference to FIGS. 1 to 4. First, a schematic configuration of a chain case 10 and a vehicle-mounted internal combustion engine 50 will be described.

Figure 1:
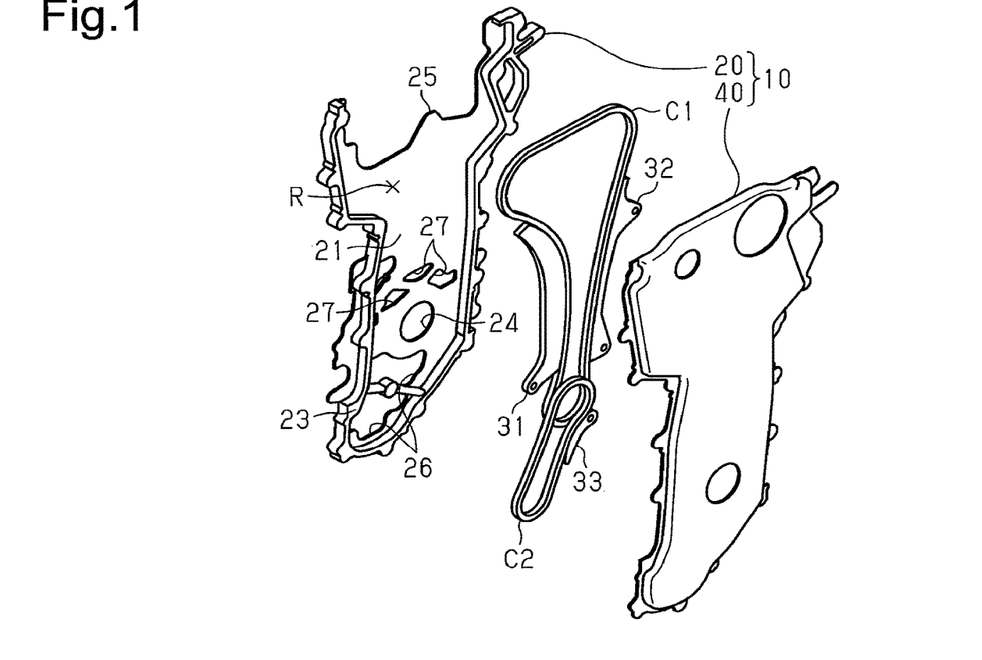
FIG. 1 is an exploded perspective view of a chain case according to one embodiment.

As shown in FIG. 1, the chain case 10 includes a rear chain case member 20 and a front chain case member 40. The front chain case member 40 has substantially the same shape as the rear chain case member 20 in a plan view. The rear chain case member 20 and the front chain case member 40 are located to face each other. The rear surface of the front chain case member is attached to the front surface of the rear chain case member 20. The rear chain case member 20 and the front chain case member 40 define a chain chamber R for accommodating a first chain C1 and a second chain C2. In the present embodiment, the first chain C1 and the second chain C2 each correspond to an endless transmission member, and the chain chamber R corresponds to an accommodation chamber.

The chain chamber R accommodates a chain tensioner 31 for adjusting the tension of the first chain C1. The chain chamber R also accommodates a first chain guide 32 for guiding the first chain C1 and a second chain guide 33 for guiding the second chain C2. In the present embodiment, the rear chain case member 20 corresponds to a first case member, and the front chain case member 40 corresponds to a second case member.

Figure 3:
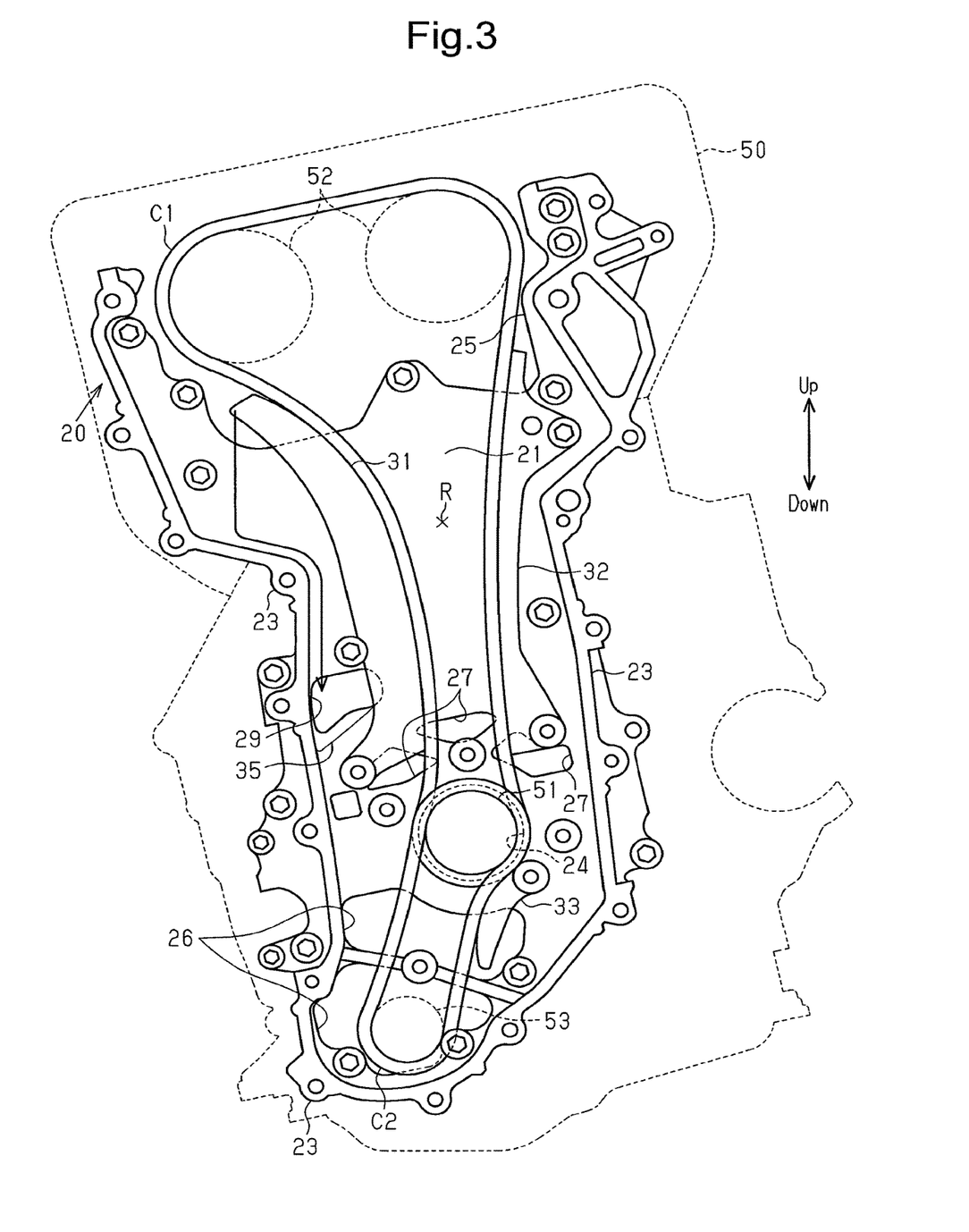
FIG. 3 is a front view of the rear chain case member.

As shown in FIG. 3, the rear chain case member 20 of the chain case 10 is attached to the front surface of the vehicle-mounted internal combustion engine 50 (the surface on the near side of the sheet of FIG. 3). In FIG. 3, the upper side and the lower side in a state in which the vehicle-mounted internal combustion engine 50 is installed in a vehicle are indicated by the arrows. In the following description, the vertical direction is described with reference to the vertical direction in an orientation of the vehicle-mounted internal combustion engine 50 when installed in the vehicle as shown in FIG. 3.

The vehicle-mounted internal combustion engine 50 includes a drive sprocket 51. The drive sprocket 51 is located inside the chain chamber R. The drive sprocket 51 is secured to a crankshaft of the vehicle-mounted internal combustion engine 50 and is rotated in accordance with the rotation of the crankshaft. In the present embodiment, the drive sprocket 51 is rotated clockwise as viewed from the front side of the front chain case member 40. The vehicle-mounted internal combustion engine 50 includes two upper idler sprockets 52. The upper idler sprockets 52 are located above the drive sprocket 51 inside the chain chamber R. The upper idler sprockets 52 are respectively secured to two camshafts of the vehicle-mounted internal combustion engine 50. The first chain C1 is looped over the drive sprocket 51 and the two upper idler sprockets 52. Thus, the drive force of the drive sprocket 51 is transmitted to the two upper idler sprockets 52 via the first chain C1. The vehicle-mounted internal combustion engine 50 includes a lower idler sprocket 53. The lower idler sprocket 53 is located below the drive sprocket 51 inside the chain chamber R. The lower idler sprocket 53 is secured to a drive shaft of an oil pump. The second chain C2 is looped over the drive sprocket 51 and the lower idler sprocket 53. Thus, the drive force of the drive sprocket 51 is transmitted to the lower idler sprocket 53 via the second chain C2. The first chain C1 and the second chain C2 are lubricated by lubricant supplied from an unillustrated oil jet. In FIG. 3, the upper idler sprockets 52 and the lower idler sprocket 53 are schematically illustrated as circles with broken lines. In the present embodiment, the drive sprocket 51, the two upper idler sprockets 52, and the lower idler sprocket 53 correspond to rotating bodies over which the endless transmission members are looped.

The rear chain case member 20 will now be described in detail.

As shown in FIG. 3, the rear chain case member 20 includes a plate-shaped main wall portion 21 and a peripheral wall portion 23. The peripheral wall portion 23 is upright on the main wall portion 21 to extend from the main wall portion 21 toward the front chain case member 40. The shape of the main wall portion 21 in a plan view is designed in accordance with the paths of the first chain C1 and the second chain C2 and is elongated in the vertical direction as a whole in the present embodiment. The peripheral wall portion 23 extends along the periphery of the main wall portion 21 on the side edge on one side of the rear chain case member 20 in the lateral direction, the lower edge, and the side edge on the other side of the rear chain case member 20 in the lateral direction. That is, the peripheral wall portion 23 extends along the section of the periphery of the main wall portion 21 other than the upper edge. As a result, the peripheral wall portion 23 surrounds the outer side of the path of the first chain C1 and the path of the second chain C2 on the main wall portion 21 from three directions including both sides and the lower part.

A circular insertion hole 24 is provided at a position slightly lower than the center of the main wall portion 21 of the rear chain case member 20 in the vertical direction. The insertion hole 24 extends through the main wall portion 21 along the thickness. The diameter of the insertion hole 24 is greater than the outer diameter of the drive sprocket 51. The drive sprocket 51 is inserted in the insertion hole 24 and located inside the chain chamber R.

A downward cut-out portion 25 is provided on the upper section of the main wall portion 21. The range of the cut-out portion 25 is determined in accordance with the sizes and the positions of the two upper idler sprockets 52. The two upper idler sprockets 52 are located at a position of the main wall portion 21 where the cut-out portion 25 is formed and are inserted through the cut-out portion 25 to be located inside the chain chamber R.

Two cut-through portions 26 are provided in the lower section of the main wall portion 21. The cut-through portions 26 extend through the main wall portion 21 along the thickness. The two cut-through portions 26 are arranged in the vertical direction. The opening range of the lower one of the two cut-through portions 26 is greater than the outer diameter range of the lower idler sprocket 53. The lower idler sprocket 53 is inserted in the lower cut-through portion 26 and is located inside the chain chamber R. The chain chamber R communicates with the inside of the vehicle-mounted internal combustion engine 50 via the two cut-through portions 26.

Multiple (three in the present embodiment) through-holes 27 are provided in the main wall portion 21 above the insertion hole 24. The through-holes 27 extend through the main wall portion 21 along the thickness. The chain chamber R communicates with the inside of the vehicle-mounted internal combustion engine 50 via the through-holes 27.

The chain tensioner 31 is arcuate and attached to the main wall portion 21 of the rear chain case member 20. The chain tensioner 31 is located above the insertion hole 24 (the drive sprocket 51) and closer to one side in the lateral direction (left side in FIG. 3) than the insertion hole 24 is. The chain tensioner 31 is attached such that the outer side of the arc faces the center of the rear chain case member 20 in the lateral direction. The chain tensioner 31 is supported at its lower end to be pivotal relative to the main wall portion 21 and is pivoted by an unillustrated drive member. The first chain C1 abuts against the surface of the chain tensioner 31 on the outer side of the arc (the surface facing the center of the rear chain case member 20 in the lateral direction) to be capable of sliding. Thus, the chain tensioner 31 guides the path of the first chain C1 with the surface on the outer side of the arc (guide surface) and is pivoted to adjust the tension of the first chain C1.

A first chain guide 32 is attached to the main wall portion 21 of the rear chain case member 20. The first chain guide 32 extends in an arc. The first chain guide 32 is located above the insertion hole 24 (the drive sprocket 51) and closer to the other side in the lateral direction (right side in FIG. 3) than the insertion hole 24 is. The first chain guide 32 is attached to the main wall portion 21 such that the outer side of the arc faces the center of the rear chain case member 20 in the lateral direction. The first chain C1 abuts against the surface of the first chain guide 32 on the outer side of the arc (the surface facing the center of the rear chain case member 20 in the lateral direction) to be capable of sliding. Thus, the first chain guide 32 guides the path of the first chain C1 with the surface on the outer side of the arc (guide surface).

A second chain guide 33 is attached to the main wall portion 21 of the rear chain case member 20. The second chain guide 33 extends in an arc. The second chain guide 33 is located below the insertion hole 24 (the drive sprocket 51) and on the same side of the insertion hole 24 as the first chain guide 32 in the lateral direction. The second chain guide 33 is attached such that the outer side of the arc faces the center of the rear chain case member 20 in the lateral direction. The second chain C2 abuts against the surface of the second chain guide 33 on the outer side of the arc (the surface facing the center of the rear chain case member 20 in the lateral direction) to be capable of sliding. Thus, the second chain guide 33 guides the path of the second chain C2 with the surface on the outer side of the arc (guide surface).

As shown in FIG. 3, a communication hole 29 is provided in the main wall portion 21 of the rear chain case member 20 to extend through the main wall portion 21 along the thickness. The communication hole 29 connects the chain chamber R to the inside of the vehicle-mounted internal combustion engine 50. The communication hole 29 is located in a region of the main wall portion 21 above the insertion hole 24 (the drive sprocket 51) and below the upper end portion of the chain tensioner 31. The communication hole 29 is located in a region closer to one side in the lateral direction (left side in FIG. 3) than the surface of the chain tensioner 31 on the outer side of the arc (guide surface) is. That is, the communication hole 29 is located in a region outward of the path of the first chain C1 in the main wall portion 21 of the rear chain case member 20.

Figure 2:
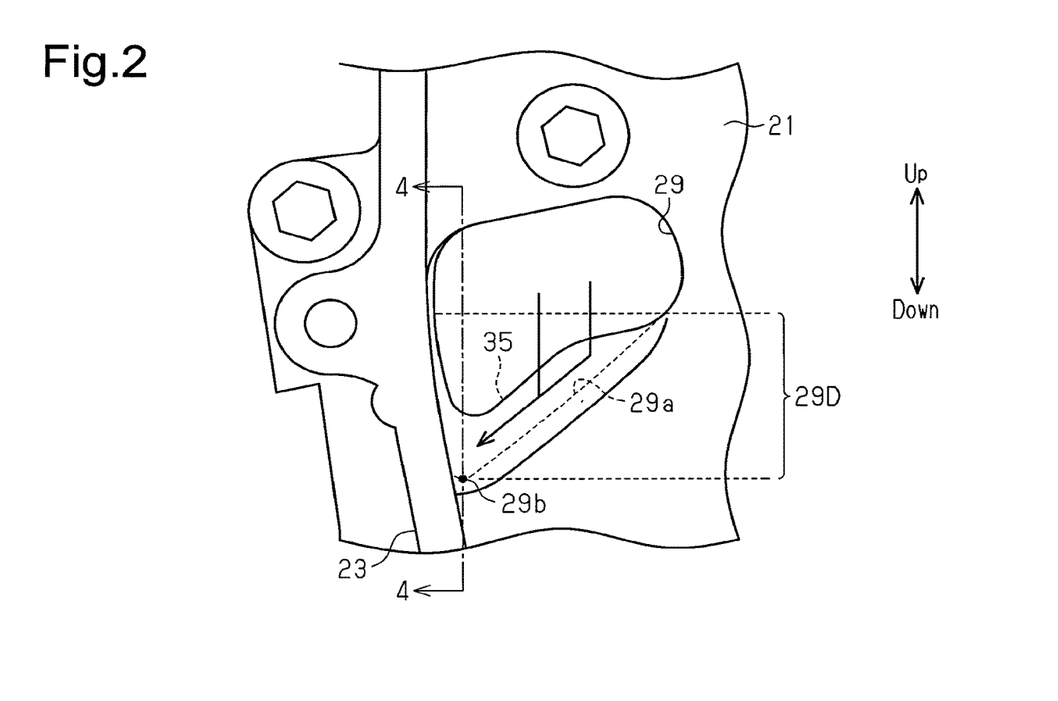
FIG. 2 is an enlarged front view of a part of the rear chain case member.

As shown in FIG. 2, the communication hole 29 extends to a position on the main wall portion 21 where the peripheral wall portion 23 is provided. In other words, the communication hole 29 is provided at a position adjacent to or that contacts the peripheral wall portion 23. In the present embodiment, almost the entire vertical length of one side of the communication hole 29 in the lateral direction reaches the position where the peripheral wall portion 23 is provided. Also, the communication hole 29 includes a lower section 29D. The width of the lower section 29D decreases toward a lower end (the lowest end) 29b of an opening edge 29a. In FIG. 2, part of the opening edge 29a of the communication hole 29 is illustrated with a broken line.

The main wall portion 21 of the rear chain case member 20 includes a guide rib 35. The guide rib 35 guides lubricant from the chain chamber R to the inside of the vehicle-mounted internal combustion engine 50. The guide rib 35 is provided along the lower part of the opening edge 29a of the communication hole 29 including the lower end 29b. More specifically, the guide rib 35 is provided along the lower section 29D of the communication hole 29 and the peripheral wall portion 23 and extends in a substantially V shape as a whole. The guide rib 35 extends from the opening edge 29a toward the inside of the chain chamber R.

Figure 4:
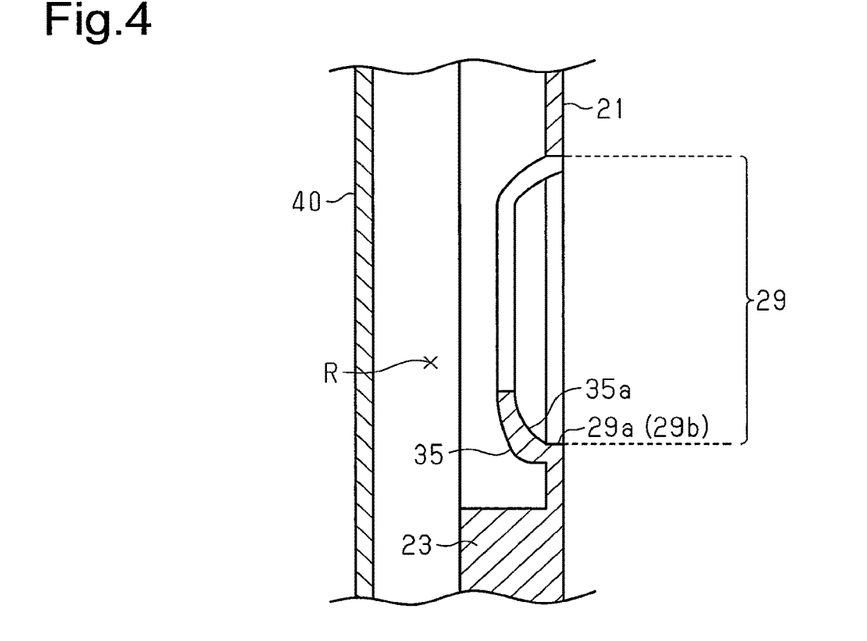
FIG. 4 is a cross-sectional view taken along line 4-4 of FIG. 2.

As shown in FIG. 4, the guide rib 35 extends from the opening edge 29a of the communication hole 29 toward the front chain case member 40 and curves toward the center of the opening of the communication hole 29. As a result, the surface of the guide rib 35 that faces the center of the opening of the communication hole 29 is curved.

As shown in FIG. 2, in particular, at a section of the guide rib 35 provided along the opening edge 29a in the lower section 29D of the communication hole 29, the surface facing the center of the opening of the communication hole 29 is an upper surface that is oriented upward. As shown in FIG. 4, in this part of the guide rib 35, the above-described curved surface is configured as an inclined surface 35a. The inclined surface 35a is tilted downward from the inside of the chain chamber R toward the opening edge 29a.

Operation and advantages of the chain case 10 configured as described above will now be described.

During operation of the vehicle-mounted internal combustion engine 50, the drive sprocket 51, which is located in the chain chamber R, is rotated clockwise as viewed from the front side of the front chain case member 40. Accordingly, the first chain C1 and the second chain C2 travel clockwise on the corresponding path as viewed from the front side of the front chain case member 40. At this time, lubricant adhered to the first chain C1 and the second chain C2 is scattered inside the chain chamber R by centrifugal force and adheres to the inner surface of the chain case 10. The lubricant that has adhered to the inner surface of the chain case 10 drops downward from, for example, the peripheral wall portion 23 of the rear chain case member 20 or flows downward along the main wall portion 21 and the peripheral wall portion 23 of the rear chain case member 20.

Also, since the first chain C1 travels clockwise, part of the first chain C1 guided by the guide surface of the chain tensioner 31 travels upward from below. Thus, excessive lubricant adhered to the first chain C1 is carried upward along the guide surface of the chain tensioner 31. As shown by the arrow in FIG. 3, the lubricant that has been carried to the top of the chain tensioner 31 drops or flows downward from the upper end portion of the chain tensioner 31. Furthermore, for example, lubricant that has adhered to the upper idler sprockets 52 drops or flows down from the vicinity of the cut-out portion 25 of the rear chain case member 20 (the vicinity of a cam housing or a cylinder head of the vehicle-mounted internal combustion engine 50).

As shown in FIG. 3, the chain case 10 of the above-described embodiment is installed in the vehicle in a tilted state as a whole such that one side in the lateral direction (left side in FIG. 3) is located lower than the other side in the lateral direction (right side in FIG. 3). Thus, in the chain chamber R, as a whole, the lubricant easily drops or flows down farther toward one side in the lateral direction (left side in FIG. 3) than the paths of the first chain C1 and the second chain C2. Thus, most of the lubricant that drops or flows downward from the upper end portion of the chain tensioner 31 flows down along a region of the main wall portion 21 of the rear chain case member 20 below the upper end portion of the chain tensioner 31 and outward of the path of the first chain C1 as shown by the arrow in FIG. 3.

In this respect, in the above-described embodiment, the communication hole 29 of the main wall portion 21 is located in a region below the upper end portion of the chain tensioner 31 and outward of the path of the first chain C1, and the guide rib 35 is located along the opening edge 29a of the communication hole 29. That is, the communication hole 29 and the guide rib 35 are located on the moving path along which the lubricant will drop or flow down from the upper end portion of the chain tensioner 31. Thus, most of the lubricant that drops or flows down from the upper end portion of the chain tensioner 31 is received by the upper surface of the guide rib 35.

Also, in the above described embodiment, the communication hole 29 and the guide rib 35 reach the position in the main wall portion 21 where the peripheral wall portion 23 is provided. Thus, for example, compared with the case in which the communication hole 29 and the guide rib 35 are provided separately from the peripheral wall portion 23, the lubricant that moves along the peripheral wall portion 23 is easily guided to the upper surface of the guide rib 35.

As shown in FIG. 4, the inclined surface 35a is provided on the upper surface of a section of the guide rib 35 that is provided along the opening edge 29a at the lower section 29D of the communication hole 29. Thus, the lubricant received by the upper surface of the guide rib 35 flows toward the opening edge 29a. Therefore, the lubricant received by the upper surface of the guide rib 35 is restrained from being left adhered to the upper surface of the guide rib 35 or spilling from the upper surface of the guide rib 35 toward the front chain case member 40. Furthermore, in the above-described embodiment, the lower section 29D of the communication hole 29 is formed such that the width is decreased toward the lower end 29b of the opening edge 29a as shown in FIG. 2. As a result, the guide rib 35 extends in a V shape. Thus, as shown by the arrow in FIG. 2, the lubricant received by the upper surface of the guide rib 35 flows downward in the extending direction of the guide rib 35, that is, toward the lower end 29b of the opening edge 29a. Thus, the lubricant received by the upper surface of the guide rib 35 is prevented from spilling to the outer side in the extending direction of the guide rib 35 and, in particular, to the center of the rear chain case member 20 in the lateral direction in the present embodiment.

When lubricant that has scattered in the chain chamber R drops or flows downward, for example, the lubricant contacts the drive sprocket 51 or the lower idler sprocket 53 in some cases. In this case, the lubricant that has dropped or flowed down is caught in the rotation of the drive sprocket 51 or the lower idler sprocket 53 and is scattered again. Also, when the lubricant drops or flows downward, the lubricant contacts the first chain C1 or the second chain C2 in some cases. In this case also, the lubricant that has dropped or flowed down is caught in the rotation of the first chain C1 and the second chain C2 and is scattered again. If such situation occurs, the lubricant in the chain chamber R is not efficiently returned to the inside of the vehicle-mounted internal combustion engine 50, and furthermore, excessive amount of air might be contained in the lubricant.

In this respect, in the above-described embodiment, the communication hole 29 and the guide rib 35 are located in the section of the main wall portion 21 above the drive sprocket 51 and the lower idler sprocket 53. Also, the communication hole 29 and the guide rib 35 are located at part of the lower section of the first chain C1 and above the second chain C2. Since some of the lubricant that has dropped or flowed down is collected by the existence of the communication hole 29 and the guide rib 35, the amount of lubricant that drops or flows further downward from the communication hole 29 and the guide rib 35 is reduced. As a result, the lubricant is restrained from contacting the drive sprocket 51 and the lower idler sprocket 53 to be scattered again, and the lubricant is restrained from contacting the first chain C1 and the second chain C2 to be scattered again.

The preferred embodiment may be modified as follows.

In the above described embodiment, the configuration of the chain tensioner 31, the first chain guide 32, and the second chain guide 33 attached to the rear chain case member 20 may be modified as required. For example, the dimension, the shape, and the position of each of the chain tensioner 31, the first chain guide 32, and the second chain guide 33 may be changed. Also, for example, the chain tensioner 31 may be configured as a chain guide that is secured to the main wall portion 21. Furthermore, any or all of the chain tensioner 31, the first chain guide 32, and the second chain guide 33 may be omitted. That is, the configuration of the chain tensioner 31, the first chain guide 32, and the second chain guide 33 may be modified as required in accordance with the conditions such as the number and the position of the sprockets provided on the vehicle-mounted internal combustion engine 50 and the paths of the chains.

In the above-described embodiment, any configuration may be employed as long as at least one chain is located in the chain chamber R of the chain case 10. For example, the lower idler sprocket 53 of the vehicle-mounted internal combustion engine 50 and the second chain C2 may be omitted.

The endless transmission members may be wet (hydraulic) timing belts instead of the first chain C1 and the second chain C2. In the case of this modification, the rotating bodies may be pulleys instead of the drive sprocket 51, the upper idler sprockets 52, and the lower idler sprocket 53.

The inclination angle when the vehicle-mounted internal combustion engine 50 is installed in the vehicle may be changed as required. For example, the vehicle-mounted internal combustion engine 50 may be installed in the vehicle in a tilted state in which, as a whole, the right side surface in FIG. 3 is located lower than the left side surface. Also, the vehicle-mounted internal combustion engine 50 may be installed in the vehicle without tilting the vehicle-mounted internal combustion engine 50 in any direction. Depending on the inclination angle when the vehicle-mounted internal combustion engine 50 is installed in the vehicle, the orientation of the chain case 10 when the vehicle-mounted internal combustion engine 50 is installed in the vehicle is also changed. Thus, for example, the configuration of the communication hole 29 and the guide rib 35 of the rear chain case member 20 may be designed assuming the orientation when the chain case 10 is installed in the vehicle.

In the above-described embodiment, the rear chain case member 20 does not necessarily have to include the peripheral wall portion 23, which is upright on the main wall portion 21. For example, the peripheral portion of the main wall portion 21 in the rear chain case member 20 may curve toward the front chain case member 40. That is, as long as the chain chamber R, which is capable of accommodating the first chain C1 and the second chain C2, is defined between the rear chain case member 20 and the front chain case member 40, the shape of the rear chain case member 20 may be changed as required.

The positions of the communication hole 29 and the guide rib 35 in the main wall portion 21 of the rear chain case member 20 may be changed as required. For example, the communication hole 29 and the guide rib 35 may be located in a region of the main wall portion 21 between the guide surface of the first chain guide 32 and the peripheral wall portion 23, or in a region of the main wall portion 21 between the guide surface of the second chain guide 33 and the peripheral wall portion 23. In any of the above modifications, the communication hole 29 and the guide rib 35 are located in a region of the main wall portion 21 outward of the paths of the chains.

Furthermore, the communication hole 29 and the guide rib 35 may be located in a region of the main wall portion 21 inward of the paths of the chains. For example, the communication hole 29 and the guide rib 35 may be located in a region of the main wall portion 21 between the guide surface of the chain tensioner 31 and the guide surface of the first chain guide 32. In this case, the shape of the opening of the communication hole 29 and the position where the guide rib 35 is located need to be adjusted such that the guide rib 35, which is located along the opening edge 29a of the communication hole 29, does not interfere with the chains.

The positions of the communication hole 29 and the guide rib 35 in the vertical direction may be changed. For example, the communication hole 29 and the guide rib 35 may be formed in a region of the main wall portion 21 below the insertion hole 24. In this case also, if the insertion hole 24 is located above the lower idler sprocket 53, which is located in the chain chamber R, the insertion hole 24 is located in a region above the position of at least one of the sprockets.

The communication hole 29 does not necessarily have to reach a position on the main wall portion 21 where the peripheral wall portion 23 is provided. That is, the communication hole 29 may be separate from the peripheral wall portion 23. If the amount of lubricant that flows down along the peripheral wall portion 23 of the rear chain case member 20 is not great, the communication hole 29 may be separate from the peripheral wall portion 23.

The shape of the opening of the communication hole 29 is not limited to the configuration illustrated in the above-described embodiment. For example, the width of the communication hole 29 may be constant in the vertical direction, or may be increased toward the lower end 29b of the opening edge 29a.

The position of the guide rib 35 along the opening edge 29a of the communication hole 29 may be changed as required. For example, the guide rib 35 may be provided along the opening edge 29a at the lower section 29D of the communication hole 29 and does not necessarily have to be provided on other parts of the opening edge 29a. That is, as long as the guide rib 35 is provided at least along the lower end 29b of the opening edge 29a of the communication hole 29, and a section where the guide rib 35 is not provided exists at part of the upper side of the opening edge 29a, the lubricant that drops or flows down from above is received by the guide rib 35.

As long as the guide rib 35 includes a section that extends along the lower end 29b of the opening edge 29a of the communication hole 29, the guide rib 35 may include a section that does not extend along the opening edge 29a.

In the above-described embodiment, the inclined surface 35a of the guide rib 35 is formed in an arc. However, the inclined surface 35a may be changed to be straight. For example, in a cross-sectional view of the guide rib 35, if the guide rib 35 projects from the main wall portion 21 toward the front chain case member 40 linearly at an angle, the inclined surface 35a of the guide rib 35 is formed to be straight.

Figure 5:
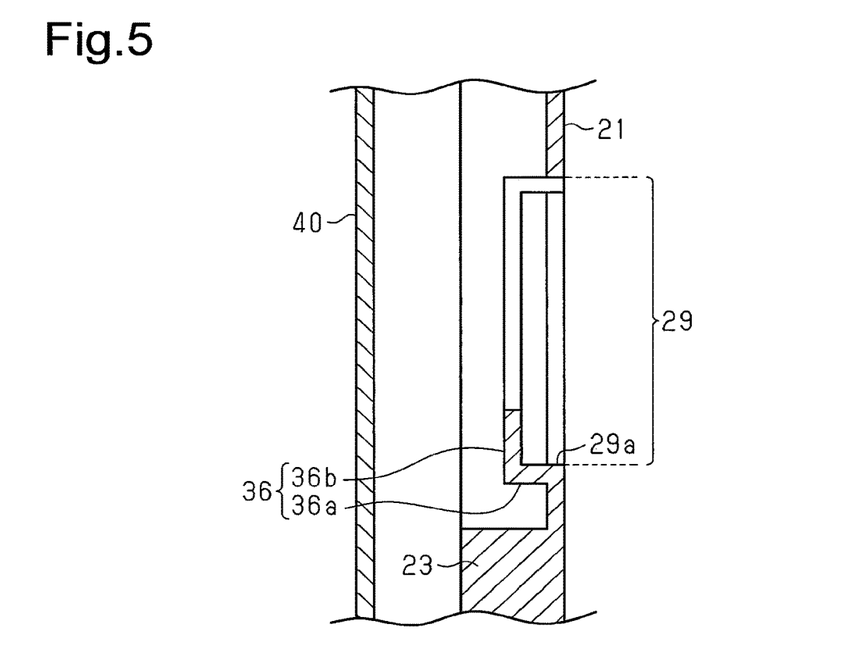
FIG. 5 is a cross-sectional view of the chain case according to a modification.

The guide rib 35 may have no inclined surface 35a. For example, a guide rib 36 shown in FIG. 5 includes a base 36a and a distal end portion 36b. The base 36a extends perpendicularly to the main wall portion 21. The distal end portion 36b extends from the distal end of the base 36a toward the center of the opening of the communication hole 29 perpendicularly to the base 36a. With this modification, the lubricant received by the upper surface of the base 36a of the guide rib 36 is prevented from overflowing from the guide rib 36 toward the front chain case member 40 by the existence of the distal end portion 36b. Thus, the lubricant received by the upper surface of the base 36a of the guide rib 36 is returned to the inside of the vehicle-mounted internal combustion engine 50 via the communication hole 29. With this modification also, the guide rib 36 guides the lubricant to the inside of the vehicle-mounted internal combustion engine 50.

Figure 6:
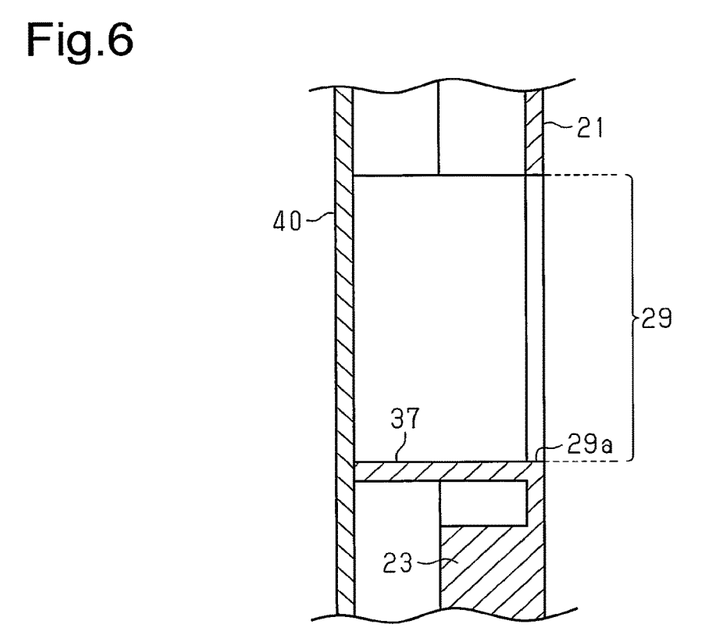
FIG. 6 is a cross-sectional view of the chain case according to a modification.

As shown in FIG. 6, a guide rib 37 may extend perpendicularly to the main wall portion 21, and the guide rib 37 may abut against the inner surface of the front chain case member 40. With this modification, no gap through which lubricant can pass is provided between the distal end of the guide rib 37 and the front chain case member 40. Thus, the lubricant received by the upper surface of the guide rib 37 is returned to the inside of the vehicle-mounted internal combustion engine 50 via the communication hole 29. With this modification also, the guide rib 37 guides the lubricant to the inside of the vehicle-mounted internal combustion engine 50.

Figure 7:
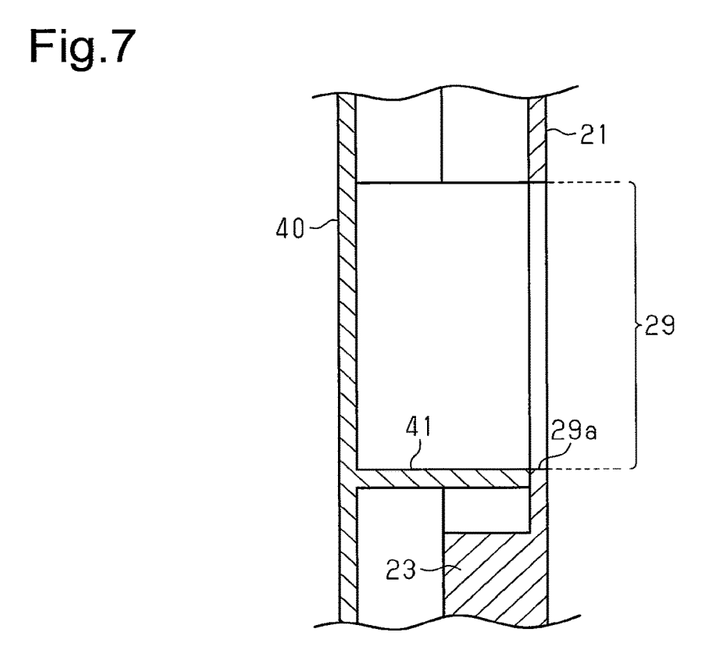
FIG. 7 is a cross-sectional view of the chain case according to a modification.

A guide rib 41 may be provided on the front chain case member 40. For example, the guide rib 41 shown in FIG. 7 projects from the inner surface of the front chain case member 40 toward the rear chain case member 20. The distal end of the guide rib 41 abuts against the main wall portion 21 of the rear chain case member 20. With this modification also, like the above-described modification shown in FIG. 6, the guide rib 41 guides the lubricant to the inside of the vehicle-mounted internal combustion engine 50.

Figure 8:
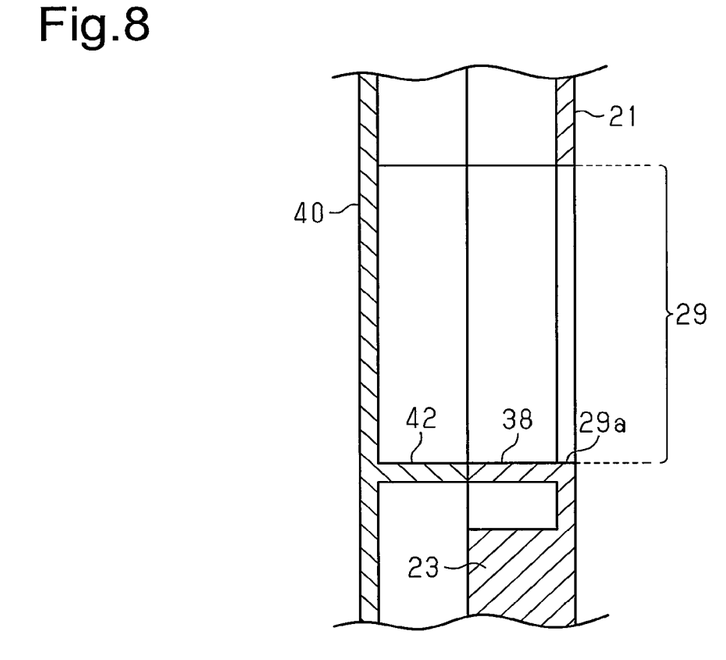
FIG. 8 is a cross-sectional view of the chain case according to a modification.

A guide rib 38 may be provided on the rear chain case member 20 and a guide rib 42 may also be provided on the front chain case member 40. For example, in the modification shown in FIG. 8, the guide rib 38 is provided to project from the main wall portion 21 of the rear chain case member 20 toward the front chain case member 40. The guide rib 42 is provided to project from the inner surface of the front chain case member 40 toward the rear chain case member 20. The distal ends of the guide rib 38 and the guide rib 42 contact each other, and thusly the guide rib 38 and the guide rib 42 function integrally as a guide rib.

The number of the communication hole 29, in which the guide rib 35 is formed along the opening edge 29a, is not limited to one, but may be more than one. For example, the guide rib 35 may be provided along the opening edge of any of the cut-through portions 26 and the through-holes 27 of the main wall portion 21. In this case, the cut-through portions 26 and the through-holes 27 in which the guide ribs are provided function as communication holes.

Any method for forming the communication hole 29 and the guide rib 35 may be employed. For example, the communication hole 29 may be formed by punching. Also, for example, in a case in which the guide rib 35 extends perpendicularly to the main wall portion 21 of the rear chain case member 20, when the communication hole 29 is formed by punching, the vicinity of the opening edge of the communication hole 29 may be curved and the curved portion may be formed as the guide rib 35. In this manner, depending on the method for forming the communication hole 29 and the shape of the guide rib 35, the communication hole 29 and the guide rib 35 can be formed simultaneously. In this case, since the guide rib 35 does not need to be joined to the rear chain case member 20 by, for example, welding, the weight of the entire chain case 10 may be reduced.

Although the multiple embodiments have been described herein, it will be clear to those skilled in the art that the present disclosure may be embodied in different specific forms without departing from the spirit of the disclosure. The disclosure is not to be limited to the details given herein, but may be modified within the scope and equivalence of the appended claims.

The invention claimed is:

1. A case for an endless transmission member, the case comprising:
  a first case configured to be attached to a vehicle-mounted internal combustion engine; and
  a second case attached to the first case, wherein
  an accommodation chamber is defined by a space between the first case and the second case and is configured to accommodate an endless transmission member looped over a plurality of rotating bodies of the vehicle-mounted internal combustion engine,
  the first case includes a main wall portion between the accommodation chamber and an inside of the vehicle-mounted internal combustion engine and includes a communication hole extending through a thickness of the main wall portion to connect the accommodation chamber to the inside of the vehicle-mounted internal combustion engine,
  the first case includes a guide rib configured to guide lubricant from the accommodation chamber to the inside of the vehicle-mounted internal combustion engine through the communication hole, the guide rib extending from an opening edge of the communication hole toward the space of the accommodation chamber, and
  in an orientation of the case when the vehicle-mounted internal combustion engine is installed in the vehicle,
    the communication hole includes a lower section which includes a lowest end of the opening edge and has a width that decreases toward the lowest end, and
    the guide rib includes an upper surface with a curved surface extending along the opening edge of the lower section of the communication hole, the curved surface curving downward from the space of the accommodation chamber toward the opening edge such that lubricant in the accommodation chamber moves toward the opening edge and through the communication hole to the inside of the vehicle-mounted internal combustion engine.

2. The case for an endless transmission member according to claim 1, wherein, in the orientation of the case when the vehicle-mounted internal combustion engine is installed in the vehicle, the communication hole is located in a region above a position of at least one of the plurality of rotating bodies and outward of a path of the endless transmission member.

3. The case for an endless transmission member according to claim 1, wherein
  the first case includes a peripheral wall portion extending from the main wall portion toward the second case,
  the peripheral wall portion extends along a periphery of the main wall portion to surround an outer side of a path of the endless transmission member, and
  the communication hole and the guide rib are provided to reach a position on the main wall portion where the peripheral wall portion is provided.

4. The case for an endless transmission member according to claim 1, wherein the curved surface of the guide rib faces a center of an opening of the communication hole.

* * * * *